3,838,006
PROCESS FOR PRODUCING HEAT-RESISTANT STARCH SYRUPS

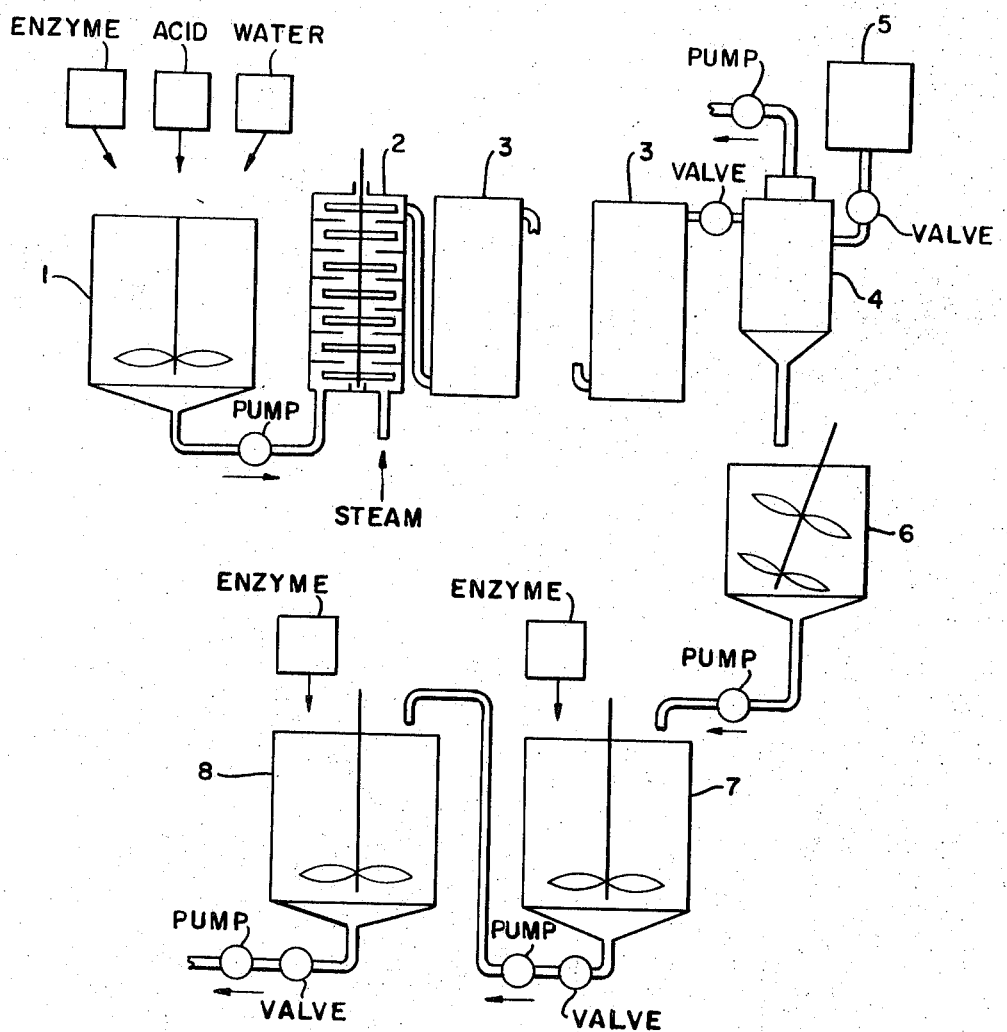

Hiromi Hijiya and Mamoru Hirao, Okayama, Japan, assignors to Hayashibara Company, Okayama-shi, Okayama, Japan
Continuation-in-part of abandoned application Ser. No. 5,879, Jan. 26, 1970. This application Sept. 19, 1972, Ser. No. 290,375
Claims priority, application Japan, Jan. 24, 1969, 44/5,124
Int. Cl. C12b 1/00
U.S. Cl. 195—31 R                                    8 Claims

ABSTRACT OF THE DISCLOSURE

This invention provides a process for producing special starch syrups which are stable against heat, very sweet, and hard to crystallize, by subjecting starch to the action of an $\alpha$-1,6-glucosidase such as isoamylase or pullulanase, in the course of manufacture of one of various starch syrups through the use of saccharogenic amylases such as $\alpha$- or $\beta$-amylase, glucoamylase and/or the like, thereby extending the scope of activity of the $\alpha$- or $\beta$-amylase and transforming the structures of the oligosaccharides and dextrins thus produced to straight-chain structures so as to obtain a starch syrup of a freely chosen composition and properties with the viscosity, flavor, and other attributes modified as desired, and then reducing the resulting syrup to sugar alcohols.

---

This application is a continuation-in-part of U.S. Ser. No. 5,879 filed Jan. 26, 1970, now abandoned without prejudice.

This invention provides a process for producing special starch syrups which are stable against heat, very sweet, and hard to crystallize. Starch is subjected to the action of an $\alpha$-1,6-glucosidase such as isoamylase or pullulanase, in the course of manufacture of one of various starch syrups through the use of saccharogenic amylases such as $\alpha$- or $\beta$-amylase, glucoamylase and/or the like, thereby extending the scope of activity of the $\alpha$- or $\beta$-amylase and transforming the structures of the oligosaccharides and dextrins thus produced to straight-chain structures so as to obtain a starch syrup of a freely chosen composition and properties with the viscosity, flavor, and other attributes modified as desired. The resulting syrup is then reduced to sugar alcohols.

To illustrate the present invention in further detail in comparison with conventional processes, it is noted that in the latter processes starch is amylolyzed to a certain dextrose equivalent (D.E.) and is imparted with viscosity and sweetness by acids or saccharogenic amylases such as $\alpha$-amylase, $\beta$-amylase, glucoamylase, etc. The amylolysis of starch by such acids or enzymes permits a change of sweetness through the control of the dextrose equivalent, which in turn keeps the viscosity at a certain constant level. In other words, if the D.E. is increased for added sweetness the viscosity will necessarily drop. Especially in the case of enzymatic hydrolysis of starch, the amyloyltic activities of $\alpha$-amylase and $\beta$-amylase are hindered midway by the $\alpha$-1,6-glucoside bonds which form the branching parts of the structure of amylopectin, the essential component of starch, thus leaving $\alpha$- and/or $\beta$-limit branched dextrins and the like behind. The D.E. after amylolysis with $\alpha$-amylase is usually about 35% and that with $\beta$-amylase is about 50%. The resulting syrups are highly viscous and cannot attain freely chosen degrees of amylolysis. Thus it is impossible by ordinary processes for preparation of starch syrups to achieve free amylolysis. Moreover, the viscosity is kept constant for the D.E. or the sweetness, and no free combination of sweetness and viscosity is attained, e.g. low sweetness and low viscosity. Further, the limit of enzymatic hydrolysis is low and the resultant is a viscous syrup. Solutions of starches saccharified by enzymes alone are, therefore, very difficult to purify by filtration or ion exchange. In order to overcome these difficulties, it has now been attempted to control freely the proportion of the constituents of starch syrups (i.e. glucose, maltose, oligosaccharides, and dextrines), by allowing the enzymes that speifically decompose $\alpha$-1,6-glucoside bonds of amylopectin, which inhibit amylolysis, ($\alpha$-1,6-glucosidases such as isoamylase, pullulanase, etc.) to act at the beginning or during the course of conversion of the starch, thereby decomposing the obstructive $\alpha$-1,6-glucoside bonds and removing the limits to activities of the enzymes, and using other amylases in one of various combinations or adding in different orders of addition for reaction.

The attempt will now be explained concretely in connection with a few examples. When a starch slurry is subjected to the action of isoamylase following hydrolysis at a high temperature of 160° to 165° C. or by the action of $\alpha$-amylase to D.E. 1 to 2 and then rapidly cooling to a temperature from 60 to 45° C., the $\alpha$-1,6-glucoside bonds are broken down and a partially hydrolyzed starch solution consisting solely of straight-chain amyloses results. However, the debranched product easily retrogrades at low temperature. Therefore, if $\beta$-amylase is added to the starch at the start of or amid the process of the debranching reaction the $\beta$-amylase is allowed to act freely and the starch can be amylolyzed (hydrolyzed) to a maltose content of 50 to 90%. If the $\beta$-amylolysis is suitably discontinued at between 60 and 70% maltose, a starch composed essentially of maltose and partly of straight-chain oligosacchrides is obtained. The resulting starch syrup has a mild sweetness (about 55% compared with glucose) and a low viscosity (60–75 cp.) in comparison with conventional starches of similar D.E. Such a syrup is shown in Example II which is hereinafter described. If isoamylase is not used, the reaction terminates at 50% maltose content.

Similarly, when startch is hydrolyzed by isoamylase to an amylose solution and the solution is suitably sweentened by glucoamylase and decomposed by $\alpha$-amylase, a starch syrup composed chiefly of glucose and which contains straight-chain oligosaccharides is obtained. The resulting starch syrup has a high sweetness (about 80% that of pure glucose) and a reasonable viscosity (about 40–50 cp.). One example of such a syrup is shown in Example III hereinbelow.

Also, subjection of starch suitably to the actions of isoamylase and $\alpha$-amylase leads to production of a starch syrup composed chiefly of maltose and oligosaccharides such as pentose and saccharides of less carbon atoms, and which has an extremely small glucose content. The resulting starch syrup, as exemplified by Example I hereinbelow, has a low sweetness (about 40% that of glucose) and a low viscosity (75–90 cp.) in comparison with commercial starches of similar D.E. (about 40). Other starch syrups have a very high maltose content and thus high sweetness based on maltose (about 54–60% that of glucose) and also a reasonable viscosity (about 65–70 cp.), as in Examples IV and V. Low sweetness (about 55% that of glucose), low viscosity (65–70 cp.) properties in a syrup composed mainly of oligosaccharides is shown in Example VI.

As described above, by the combined use of isoamylase with $\alpha$-, $\beta$-amylase or glucoamylase, starch syrups having diversified combinations of sweetness and viscosity can be obtained. The starch syrups so obtained differ in compositions from ordinary products and vary widely in the flavors and tastes. The procedures above described bring a variety of special products including starch syrups of low viscosity and low sweetness which have not hitherto been considered possible, thus calling for an important revision of the concept of starch syrups so far entertained by those skilled in the art. Nevertheless, because these starch syrups contain some amount of glucose or maltose, they naturally have limited resistance to heat and, in applications which involve heating or where impurities or mixtures active against carbonyl groups are to be added, the syrups may sometimes be colored to a disadvantage. For this reason, the present inventors subjected the starch syrups prepared in the foregoing manner to reduction by hydrogenation thereby to convert the same to sugar alcohols of syrup composition (glucose, maltose and oligosaccharides). To be more specific, when starch syrups at a concentration of 50 percent were reacted with hydrogen gas at a pressure of about 100 kg./cm.$^2$ using a Raney nickel catalyst, sugar alcohol starch syrups resulted which showed no sign of reducibility and contain sorbitol, maltitol and other oligosaccharide alcohols. Analyses of the syrups indicated that the molecules of oligosaccharide had remained undecomposed but the starch syrups had just been hydrogenated to sugar alcohols. It was also confirmed by Smith's method that the structures of the products were practically free from branches. It was found, after comparative study of the products with conventional ones in connection with heat resistance, viscosity, sweetness, moisture absorption, flavor, etc., that maltose had been converted to sweeter maltitol, thereby remarkably increasing the sweetness and improving the flavors of the products. The resulting syrups were less viscous than ordinary ones of approximately the same D.E. values, and tended to show higher degrees of threadability. Last but not least important, the heat resistance of the products was such that, when they were concentrated by heating on direct fire in accordance with the usual candy test, ordinary starch syrups resisted the heat up to 130° C., whereas, on the same D.E. basis, the syrups prepared by using isoamylase resisted the heat up to 155° C. and the sugar alcohol syrups underwent no decomposition or coloration up to 200° C. or nearly to the anhydrous state. It was further found that the products are little colored or otherwise affected by the addition of amino acids or the like or by heating.

As for other general features, glucose and maltose are converted to hard-to-crystallize or non-crystallizable sorbitol and maltitol and the products containing these constituents in accordance with the present invention have only limited crystallinity. The moisture-retaining quality is improved and it synergetically acts with the sweetness when the syrups are added to foods, while no excessive viscosity is imparted. Thus syrups, as additives to foods, which are free from the drawbacks of ordinary products and which are capable of exploring many new applications have been found. For these reasons, the present invention has enabled what have heretofore been longed for in vain to be produced for the first time on the commercial basis.

EXAMPLE

Starches of corn, white potato, sweet potato, wheat, sago, etc. may be used as raw material. For the purpose of the present invention, amylomaize starch or amylose separated from ordinary starch is preferred, but such a material is expensive. It is for this reason that corn starch or white potato starch was used in the experiment under review. Because of the nature of the enzymes utilized, the starch slurry was prepared to a concentration in the range of 30 to 40%, or somewhat lower than the usual concentrations for ordinary starch slurries.

The procedure for liquefaction was continuous. Since the saccharification took much time, a batch method was employed for saccharification. A general flow of the operation performed is illustrated in the accompanying drawing.

The single figure in the accompanying drawing is a schematic representation of an exemplary continuous reaction equipment for embodying the present invention.

Controlled amounts of the enzyme and acid are supplied to a starch feed tank 1 and the pH and concentration of the mixture are adjusted. The resulting starch slurry is pumped to a liquefier 2, wherein it is directly heated with live steam, with vigorous stirring, so that the starch is gelatinized and dissolved. In a retention vessel 3, the D.E. of the solution is adjusted through the control of the retention time. Next, the solution is led through a reducing valve and injected into a vacuum cooler 4 for quick cooling to a certain temperature. At the same time the enzyme required for the primary conversion is continuously added from 5 and the mixture is vigorously agitated in a first preconverter 6 and pumped to a first converter 7 and thence to a second converter 8, where secondary conversion is accomplished with the addition of the enzyme. The retention time for liquefaction is adjusted by increasing or decreasing the number of passes through the retention vessel 3.

Concerning the conditions for liquefaction, corn starch, a terrestrial starch hard to liquefy, was liquefied at a high temperature of about 160° C. as shown in Table 1 to ensure complete liquefaction. White potato starch was continuously liquefied with a liquefying amylase at 90° C. and the reaction was stopped at a suitable D.E. When the pH was slightly decreased by the addition of a small amount of acid in place of the enzyme, the liquefaction was facilitated.

The enzymes employed for the conversion purpose were as follows. As the liquefying amylase, a bacterially produced $\alpha$-amylase (C) which was commercially available was used, and as $\beta$-amylase (B) the enzyme extracted from wheat bran was used. The glucoamylase (R) was in the form of a cultured fluid of *Rhizopus delemar*. As $\alpha$-1,6-glucosidases three varieties were used, i.e., bacterially produced pullulanase (P), isoamylase (I) yielded by the bacteria of *Pseudomonas amyloderamosa* (A.T.C.C. No. 21,262), and the $\alpha$-1,6-glucosidase (L) afforded by *Lactobacillus plantarum* (A.T.C.C. No. 8008).

The experimental results are given in Table 1. In Examples I and II the D.E. of liquefied starch slurries were low (about 1 to 5 D.E.) and the viscosity very high, and therefore the liquefied starches were quickly cooled to the temperature for the first conversion. Then simultaneously with the addition of amylase, each starch solution was vigorously stirred in the preconverter to progress saccharification before retrogradation takes place. The pH was adjusted to about 6.0 and the temperature was kept below 50° C., preferably at about 50° C. In Examples III to VI, wherein the retention time for the first conversion was fully extended to more than 20 hours, the amount of $\beta$-amylase or glucoamylase was adjusted to obtain a suitable D.E. value.

Secondary conversion is the stage which dictates the ultimate composition of the particular starch syrup being made, and hence the amount of enzyme to be added and the reaction time must be suitably adjusted. In Example I the amylase obtained by breaking down the $\alpha$-1,6-glucoside bonds of the starch was fully decomposed by the $\alpha$-amylase at a temperature of about 45° C. and a pH about 6.0 to yield a starch syrup of low saccharinity composed chiefly of oligosaccharides, with little glucose and maltose contents. In Example II a starch syrup comprised mainly of maltose was subjected to the action of $\alpha$-amylase and residual dextrins were decomposed to lower the viscosity. A starch syrup mostly composed of maltose resulted which was highly resistant to heat, adequately boiled dry, and suitable for confectionery use. In Example III the starch is hydrolyzed by an $\alpha$-1,6-glucosidase from *Lactobacillus plantarum* and sweetened with glucoamylase at a temperature of about 45° C. and a pH of about 5.5 and then decomposed by $\alpha$-amylase at a temperature of about 45° C. and a pH of about 6.0 to give a starch syrup which was very sweet because it was largely composed of glucose. Examples IV and V afforded starch syrups containing maltose as the main constituent. In Example VI the starch was thoroughly hydrolyzed by $\alpha$-amylase

TABLE OF EXAMPLES

| Example number | I | II | III | IV | V | VI |
|---|---|---|---|---|---|---|
| Kind | Corn starch | Corn starch | Corn starch | High amylose starch | White potato starch | White potato starch |
| Starch conc. (percent) | 35 | 35 | 35 | 30 | 40 | 35 |
| Liquefying enzyme or acid | | | | Oxalic acid | Oxalic acid | Liqfg. enzyme, 10 μ/g | Liqfg. enzyme, 15μ/g |
| Liqfg. temp. (° C.) | 163 | 165 | 120 | 120 | 90 | 90 |
| 1st conv.: | | | | | | |
| Enzyme (unit/gram. starch) | L 40, B 10 | L 40 | L 30 | B 10 | P 30, B 5 | C 5 |
| Temp. (° C.) | 50 | 50 | 45 | 60 | 45 | 60 |
| pH | 6.0 | 6.0 | 5.5 | 5.5 | 6.0 | 6.0 |
| 2nd conv.: | | | | | | |
| Enzyme (unit/gram starch) | C 20 | C 20 | C 20 | I 30 | | P 20 |
| Temp. (° C.) | 45 | 50 | 45 | 45 | 45 | 45 |
| pH | 6.0 | 6.0 | 6.0 | 5.5 | 6.0 | 6.0 |
| D.E. | 40 | 48 | 70 | 51 | 55 | 51 |
| Main comp | Oligo. sacc | Maltose olig | Glucose olig | Maltose olig | Maltose olig | Oligo. sacc |
| Reduction conc. (percent) | 50 | 50 | 45 | 45 | 45 | 45 |
| Raney nickel catalyst (percent) | 8 | 8 | 10 | 10 | 8 | 10 |
| Temp. (° C.) | 50–90 | 50–90 | 50–90 | 50–90 | 50–90 | 50–90 |
| H pressure (kg./cm.²) | 30–100 | 30–100 | 30–100 | 40–100 | 40–90 | 40–90 |
| CaCO₃ added, percent | 0.1 | 0.1 | 0.2 | 0.1 | 0.2 | 0.2 |
| Residual reducing sugar, percent | 0.1 | 0.1 | 0.2 | 0.1 | 0.1 | 0.1 |
| Viscosity (cp.) after reduc. (65% conc. at 37.5° C.) | 85 | 70 | 45 | 72 | 65 | 73 |
| Sweetness against glucose (percent) | 40 | 55 | 80 | 54 | 60 | 55 | at a temperature of about 60° C. and a pH of about 6.0, and the oligosaccharides and dextrins produced had relatively low molecular weights, while the residual dextrins were freed of the branches by the action of the α-1,6-glucosidase at a temperature of about 45° C. and a pH about 6.0. Thus, with the drop of viscosity, the product was a unique syrup not so viscous as conventional starch syrups.

While only a few examples of the invention have been tabulated and described above, it should be obvious that the composition of the particular starch syrup, or the proportions of the component sugars such as glucose and maltose, can be freely and largely modified through the control of the amount of the individual enzymes. Furthermore, the viscosity of the resulting starch syrup is not limited to the usual range of viscosity for ordinary products. Notwithstanding the fact that they are enzyme converted products, the special starch syrups prepared in the manner described contain no macro-molecular dextrin and can be easily purified by means of powdery charcoal or ion exchange resin. The treated products are colorless, clear and pure starch syrups.

In the series of experiments, each starch syrup thus prepared and adjusted to a concentration between 40 and 60% was placed in an autoclave. With the addition of 4 to 10% Raney nickel catalyst, hydrogen was pumped into the vessel and the charge was agitated for reaction with the hydrogen. At a hydrogen pressure of 20 to 100 kg./cm.², the temperature was gradually increased and the charge was reduced until the remaining reducing sugar was less than 0.5%. The reaction with heat was concluded at a temperature not high enough to cause the breakdown of the glucoside linkage, or not higher than 100° C. After the reaction, the catalyst was filtered off and the resultant was purified by ion exchange and then the nickel was removed to obtain a colorless, clear liquid. When the pH tended to drop during the reaction, it was maintained at the suitable level by the addition of a base, for example, calcium carbonate. The addition of base is preferably within the range of 0.05–0.3%. The compositions of end products so obtained were analyzed by paper chromatography to consist essentially of sorbitol, maltitol and hydrogenated oligosaccharides. The products were very sweet and yet refined and flavory in taste and limited in viscosity. They were remarkedly resistant to heat, remaining unaffected by temperatures up to 200° C. Even when heated in mixture with a nitrogen compound, they underwent no coloration to a great advantage.

It will be obvious to those skilled in the art that various changes may be made without departing from the scope of the invention and the invention is not to be considered limited to what is shown in the drawings and described in the specification.

What is claimed is:

1. A process for producing a heat-resistant starch syrup from starch, said syrup having a low sweetness of about 40% that of glucose and a relatively low viscosity of about 75 to 90 cp. and whose main components are oligosaccharide alcohols, comprising the steps of:
   liquefying the starch;
   quickly cooling said liquefied starch to a temperature from 45 to 60° C.;
   subjecting said liquefied starch to the action of α-1,6-glucosidase yielded by *Lactobacillus plantarum* in a first conversion step conducted at about 50° C. and at a pH of about 6.0;
   hydrolizing said liquefied starch resulting from said first conversion step with α-amylase in a second conversion step conducted at about 45° C. and at a pH of about 6.0 thereby yielding a starch syrup with a D.E. of about 40; and
   reducing any glucose, maltose and oligosaccharides present in said starch syrup to sorbitol, maltitol and oligosaccharide alcohols by catalytic hydrogenation conducted in the presence of a basic substance.

2. A process in accordance with claim 1 wherein said reducing step is accomplished by reacting with hydrogen gas at a pressure of 20–100 kg./cm.² in the presence of a Raney nickel catalyst at a temperature above 50° C. but not higher than 100° C. in the presence of 0.05–0.3% CaCO₃.

3. A process for producing a heat resistant starch syrup from starch, said syrup having a high sweetness of about 80% that of glucose and a reasonable viscosity of about 40 to 50 cp. and whose main components are sorbitol and oligosaccharide alcohols, comprising the steps of:
   liquefying the starch;
   quickly cooling said liquefied starch to a temperature from 45 to 60° C.;
   subjecting said liquefied starch to the action of the α-1,6-glucosidase yielded by *Lactobacillus plantarum* and glucoamylase in a first conversion step conducted at about 45° C. and at a pH of about 5.5;
   hydrolizing said liquefied starch resulting from said first conversion step with α-amylase in a second conversion step conducted at about 45° C. and at a pH of about 6.0 thereby yielding a starch syrup with a D.E. of about 70; and
   reducing any glucose, maltose and oligosaccharides present in said starch syrup to sorbitol, maltitol and oligosaccharide alcohols by catalytic hydrogenation conducted in the presence of a basic substance.

4. A process in accordance with claim 3 wherein said reducing step is accomplished by reacting with hydrogen gas at a pressure of 20–100 kg./cm.$^2$ in the presence of a Raney nickel catalyst at a temperature above 50° C. but not higher than 100° C. in the presence of 0.05–0.3% CaCO$_3$.

5. A process for producing a heat resistant starch syrup from starch, said syrup having a mild sweetness of about 55% that of glucose and a low viscosity of about 60 to 75 cp. and whose main components are maltitol and oligosaccharide alcohols, comprising the steps of:
  liquefying the starch;
  quickly cooling said liquefied starch to a temperature from 45 to 60° C.;
  subjecting said liquefied starch to the action of α-1,6-glucosidase yielded by *Lactobacillus plantarum* and β-amylase in a first conversion step conducted at about 50° C. and at a pH of about 6.0;
  hydrolyzing said liquefied starch resulting from said first conversion step with α-amylase in a second conversion step conducted at about 50° C. and at a pH of about 6.0 thereby yielding a starch syrup with a D.E. of about 48; and
  reducing any glucose, maltose and oligosaccharides present in said starch syrup to sorbitol, maltitol and oligosaccharide alcohols by catalytic hydrogenation conducted in the presence of a basic substance.

6. A process in accordance with claim 5 wherein said reducing step is accomplished by reacting with hydrogen gas at a pressure of 20–100 kg./cm.$^2$ in the presence of a Raney nickel catalyst at a temperature above 50° C. but not higher than 100° C. in the presence of 0.05–0.3% CaCO$_3$.

7. A process for producing a heat resistant starch syrup from starch, said syrup having a low sweetness of about 55% that of glucose and a low viscosity of about 65 to 75 cp. and whose main components are oligosaccharide alcohols, comprising the steps of:
  liquefying the starch;
  quickly cooling said liquefied starch to a temperature from 45 to 60° C.;
  hydrolyzing said liquefied starch with α-amylase in a first conversion step conducted at about 60° C. and at a pH of about 6.0;
  subjecting said hydrolyzed starch resulting from said first conversion step to the action of α-1,6-glucosidase in a second conversion step conducted at about 45° C. and at a pH of about 6.0 thereby yielding a starch syrup with a D.E. of about 51; and
  reducing any glucose, maltose and oligosaccharides present in said starch syrup to sorbitol, maltitol and oligosaccharide alcohols by catalytic hydrogenation conducted in the presence of a basic substance.

8. A process in accordance with claim 7 wherein said reducing step is accomplished by reacting with hydrogen gas at a pressure of 20–100 kg./cm.$^2$ in the presence of a Raney nickel catalyst at a temperature above 50° C. but not higher than 100° C. in the presence of 0.05–0.3% CaCO$_3$.

References Cited
UNITED STATES PATENTS

| | | | |
|---|---|---|---|
| 2,891,869 | 6/1959 | Langlois | 195—31 |
| 3,329,507 | 7/1967 | Conrad | 99—141 |
| 3,708,396 | 1/1973 | Mitsuhashi et al. | 195—31 |
| 3,692,580 | 9/1972 | Hirao et al. | 195—31 |

A. LOUIS MONACELL, Primary Examiner

T. G. WISEMAN, Assistant Examiner

U.S. Cl. X.R.

127—29; 195—12; 260—635 C; 426—215